United States Patent [19]
Fischer

[11] Patent Number: 5,407,220
[45] Date of Patent: Apr. 18, 1995

[54] ROTARY TRAILER SWAY DAMPENER

[76] Inventor: Edmond M. Fischer, 89-25 92 St., Woodhaven, N.Y. 11421

[21] Appl. No.: 76,597

[22] Filed: May 13, 1993

[51] Int. Cl.⁶ .............................................. B60D 1/32
[52] U.S. Cl. ............................... 280/455.1; 280/446.1
[58] Field of Search ...................... 280/455.1, 474, 432, 280/446.1

[56] References Cited
U.S. PATENT DOCUMENTS

| | | | |
|---|---|---|---|
| 3,338,595 | 8/1967 | Bogie | 280/455.1 |
| 3,379,456 | 4/1968 | Bogie | 280/455.1 |
| 3,659,874 | 5/1972 | Rendessy | 280/455.1 |
| 4,015,856 | 4/1977 | Smith | 280/455.1 |

Primary Examiner—Mitchell J. Hill

[57] ABSTRACT

A rotary trailer sway dampener for preventing a trailer from swaying back and forth during towing. The dampener is mounted on a trailer tongue and a cable connects the dampener to the towing vehicle. The cable encircles the dampener and causes the dampener to rotate whenever the trailer oscillates. The dampener utilizes a planetary gear system to spin agitators in an oil bath for creating resistance to the rotation of the dampener thus terminating the oscillations encountered by the trailer.

7 Claims, 5 Drawing Sheets

ROTARY TRAILER SWAY DAMPENER

BACKGROUND OF THE INVENTION

1. Field of the Invention

The present invention relates to anti-sway trailer attachments and more particularly pertains to a rotary trailer sway dampener which may be utilized for preventing a trailer from swaying back and forth during towing.

2. Description of the Prior Art

The use of anti-sway trailer attachments is known in the prior art. More specifically, anti-sway trailer attachments heretofore devised and utilized for the purpose of preventing a trailer in tow from swaying back and forth are known to consist basically of familiar, expected and obvious structural configurations, notwithstanding the myriad of designs encompassed by the crowded prior art which have been developed for the fulfillment of countless objectives and requirements.

For example, U.S. Pat. No. 4,582,337 describes an anti-sway trailer attachment which may be utilized to couple a trailer to a towing vehicle in a manner such that slight lateral left and right movements of the forward end of the towing vehicle will not be transferred into lateral left and right movements, respectively, of the trailer.

Another anti-sway trailer attachment can be seen in U.S. Pat. No. 4,165,885 which illustrates a friction sway control apparatus for trailers that includes a bar and friction brake arrangement to minimize or eliminate the tendency of a trailer to sway.

U.S. Pat. No. 3,837,676 describes an anti-sway trailer attachment that utilizes a cable arranged in a serpentine path over a plurality of pulleys to provide for frictional dampening of the cable movement as a result of the respective trailer movement.

The anti-sway trailer attachments mentioned heretofore utilize either an expendable friction braking arrangement or a spring and push-rod arrangement. The expendable friction braking anti-sway devices provide a constant dampening force that counteracts the swaying of a trailer but does not allow the trailer to return to a substantially centered equilibrium position. Furthermore, the expendable friction braking anti-sway devices will eventually wear away the braking material which must then be replaced. The spring and push rod arrangement provides a counteracting force to the movement of the front end of the towing vehicle but does not provide dampening to the oscillations encountered by the trailer.

In this respect, the rotary trailer sway dampener according to the present invention substantially departs from the conventional concepts and designs of the prior art anti-sway trailer attachments, and in so doing provides an apparatus primarily developed to provide a variable amount of dampening for preventing a trailer from swaying back and forth during towing and also the dampening any oscillations encountered by the trailer.

Therefore, it can be appreciated that there exists a continuing need for a new rotary trailer sway dampener which utilizes a planetary gear system to spin agitators in an oil bath for dampening oscillations encountered by a trailer. In this regard, the present invention substantially fulfills this need.

SUMMARY OF THE INVENTION

In view of the foregoing disadvantages inherent in the known types of anti-sway trailer attachments now present in the prior art, the present invention provides a new rotary trailer sway dampener construction wherein the same can be utilized for preventing a trailer from swaying back and forth during towing. As such, the general purpose of the present invention, which will be described subsequently in greater detail, is to provide a new rotary trailer sway dampener apparatus and method which has many of the advantages of the anti-sway trailer attachments mentioned heretofore and many novel features that result in a new rotary trailer sway dampener which is not anticipated, rendered obvious, suggested, or even implied by any of the prior art anti-sway trailer attachments, either alone or in any combination thereof.

To attain this, the present invention essentially comprises a rotary dampener attached to the tongue of a trailer and connected to an associated towing vehicle with a cable in such a manner so that the cable serves to rotate the dampener during oscillations of the trailer. The dampener utilizes a planetary gear system to spin agitators in an oil bath for creating resistance to the rotation of the dampener thereby providing dampening of the oscillations encountered by the trailer.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new rotary trailer sway dampener apparatus and method which has many of the advantages of the anti-sway trailer attachments mentioned heretofore and many novel features that result in a rotary trailer sway dampener that is not anticipated, rendered obvious, suggested, or even implied by any of the prior art anti-sway trailer attachments, either alone or in any combination thereof.

It is another object of the present invention to provide a new rotary trailer sway dampener which may be easily and efficiently manufactured and marketed.

It is a further object of the present invention to provide a new rotary trailer sway dampener which is of a durable and reliable construction.

An even further object of the present invention is to provide a new rotary trailer sway dampener which is susceptible of a low cost of manufacture with regard to both materials and labor, and which accordingly is then susceptible of low prices of sale to the consuming public, thereby making such rotary trailer sway dampeners economically available to the buying public.

Still yet another object of the present invention is to provide a new rotary trailer sway dampener which provides in the apparatuses and methods of the prior art some of the advantages thereof, while simultaneously overcoming some of the disadvantages normally associated therewith.

Still another object of the present invention is to provide a new rotary trailer sway dampener for preventing a trailer from swaying back and forth during towing.

Yet another object of the present invention is to provide a new rotary trailer sway dampener which utilizes a planetary gear system to spin agitators in an oil bath for creating resistance to oscillations encountered by a trailer in tow.

Even still another object of the present invention is to provide a new rotary trailer sway dampener that may be easily attached to existing trailers and towing vehicles without substantial modification thereof.

Even still yet another object of the present invention is to provide a new rotary trailer sway dampener that will provide a variable amount of dampening to the oscillations encountered by a trailer in tow.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
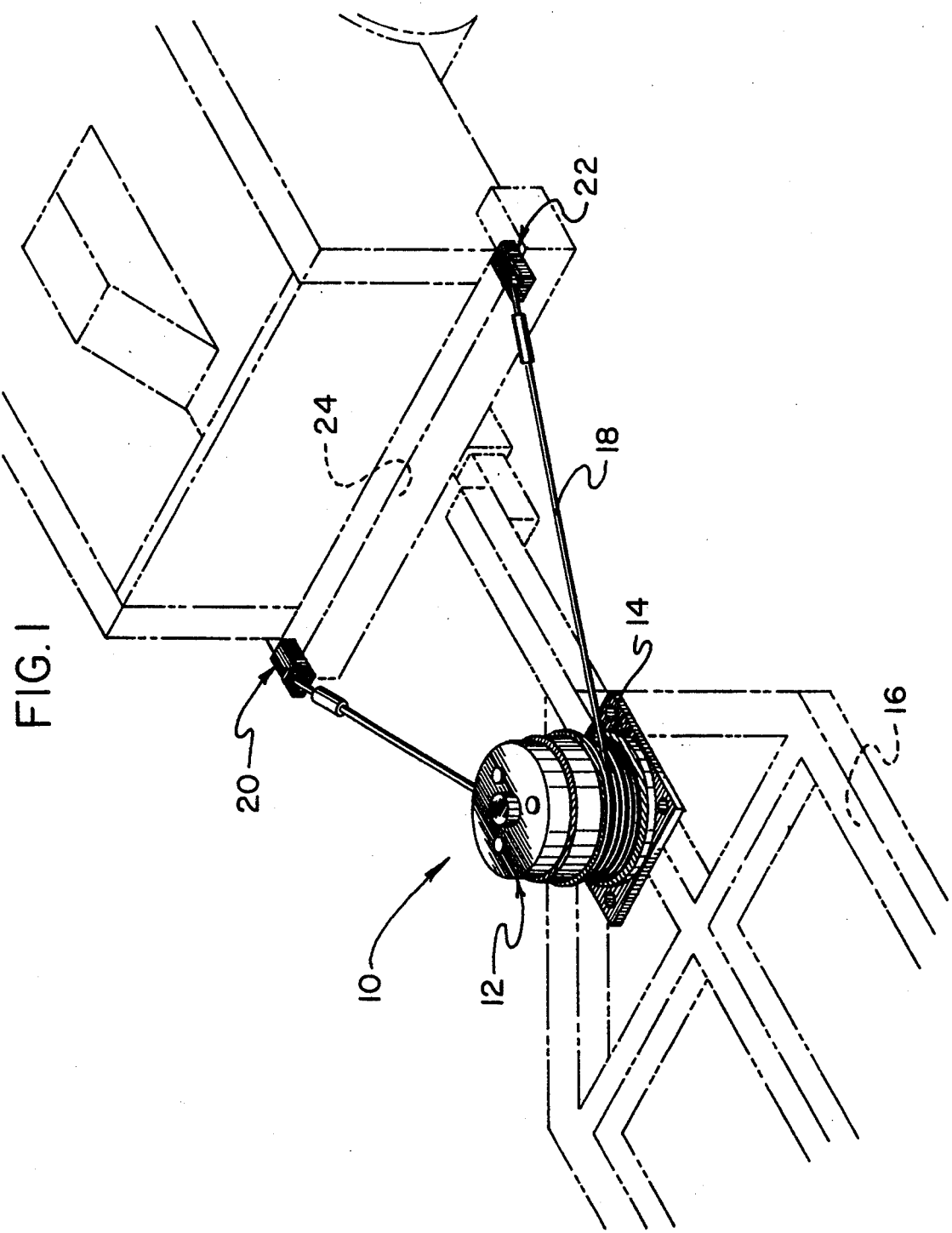
FIG. 1 is a perspective view of a rotary trailer sway dampener comprising the present invention.
Figure 2:
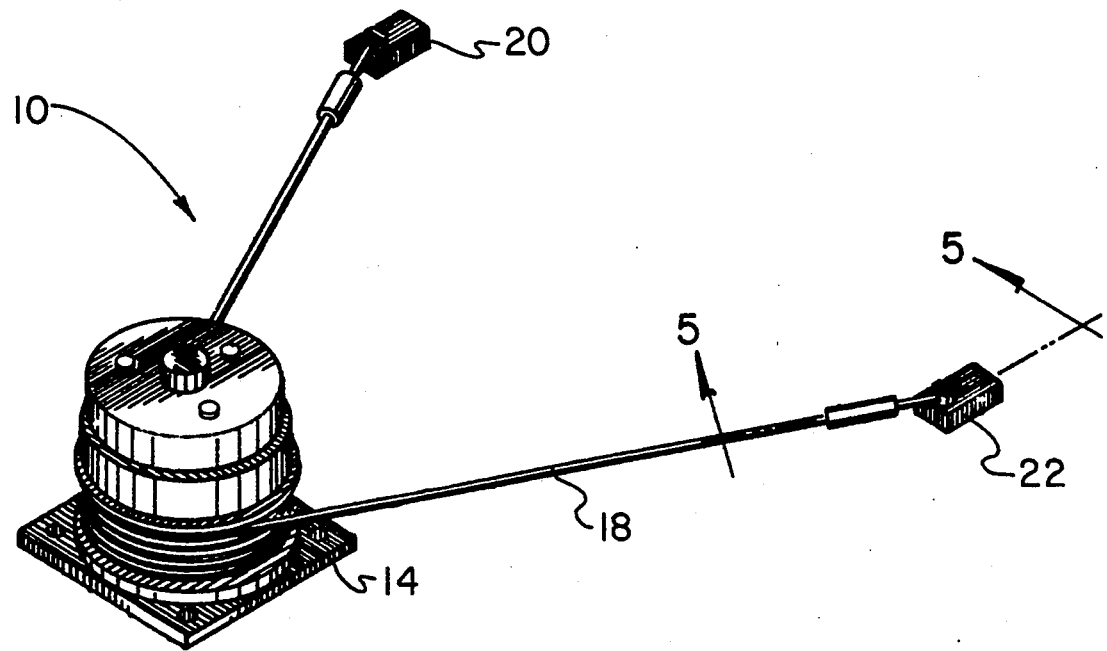
FIG. 2 is a further perspective view of the present invention.
Figure 3:
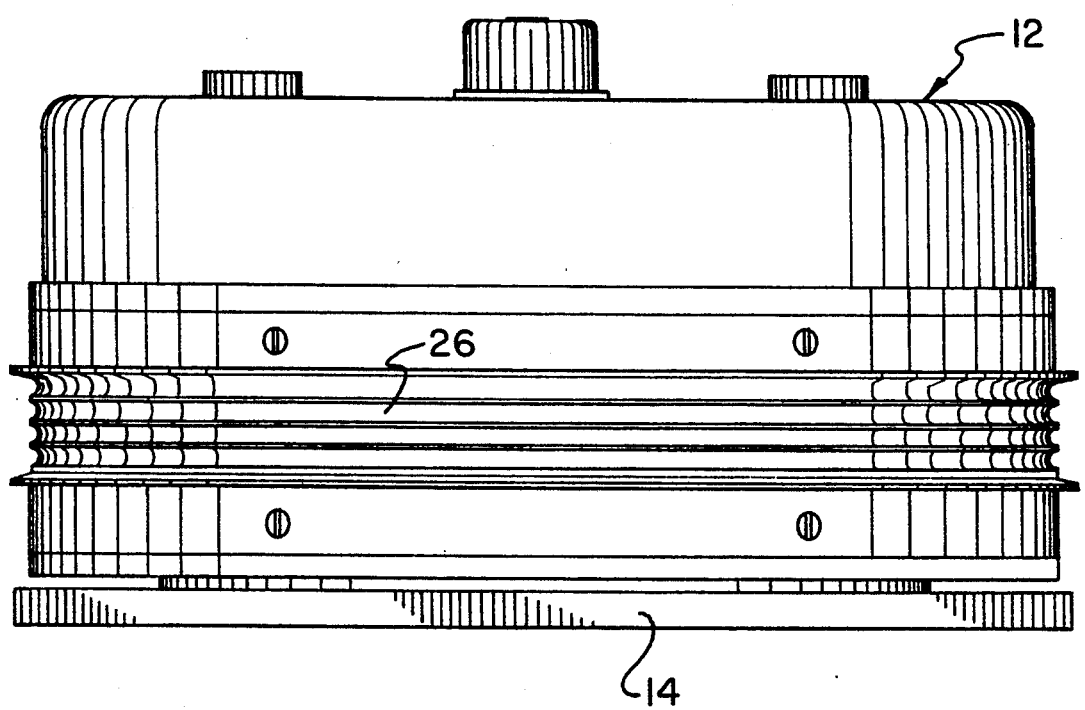
FIG. 3 is a front elevation view of the invention.
Figure 4:
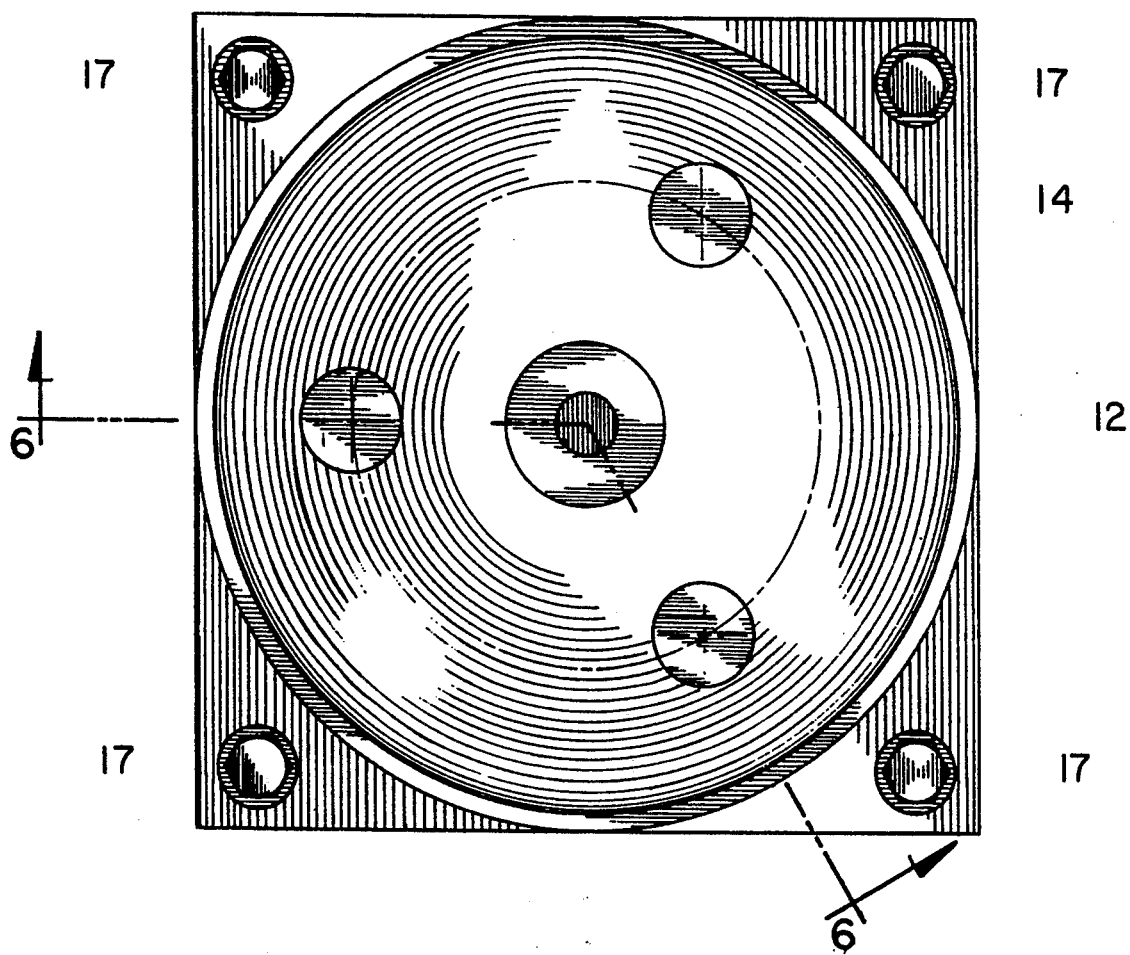
FIG. 4 is a top plan view of the present invention.

With reference now to the drawings, and in particular to FIGS. 1-4 thereof, a new rotary trailer sway dampener embodying the principles and concepts of the present invention and generally designated by the reference numeral 10 will be described.

More specifically, it will be noted that the rotary trailer sway dampener 10 comprises a dampener assembly 12 that is fixedly secured to a base plate 14 which is further secured to a trailer 16 by a plurality of fasteners 17. A cable 18 is connected to a pair of anchors 20, 22 that are removably attached to the towing vehicle's bumper 24. The cable 18 follows a path from the first anchor 20 to the dampener assembly 12 where it circumscribes and frictionally engages a cable guide 26 and then terminates at a second anchor 22. The cable guide 26 is fixedly secured to the dampening assembly 12 so that when the cable moves linearly with respect to the base plate 14, the cable guide and subsequently the dampener assembly will rotate proportionally in both angular displacement and angular velocity to the displacement and velocity of the cable, respectively.

Figure 5:
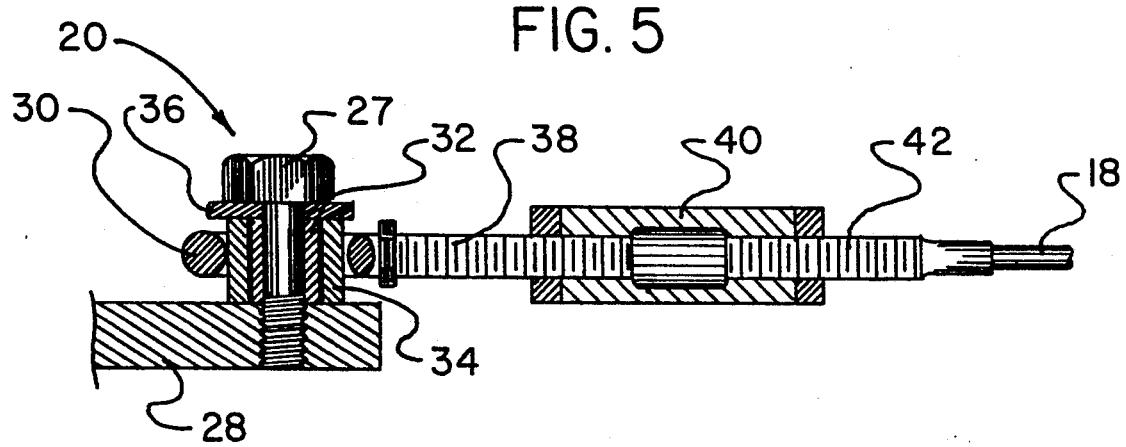
FIG. 5 is a partial cross sectional view taken along line 5—5 of FIG. 2.

A detail of the first anchor 20 can be seen in FIG. 5. The anchor 20 comprises a securing bolt 27 engaged to a mounting plate 28 whereby an end ring 30 may be rotatably captured therebetween. The end ring 30 pivots around the securing bolt 27 on bushings 32, 34 and a washer 36. The end ring 30 is further connected to a rod 38 that may be threaded into a coupler 40 which is in turn threaded onto a cable end 42. The second anchor 22 is constructed in substantially the same manner as illustrated above and provides a similar use as well.

Figure 6:
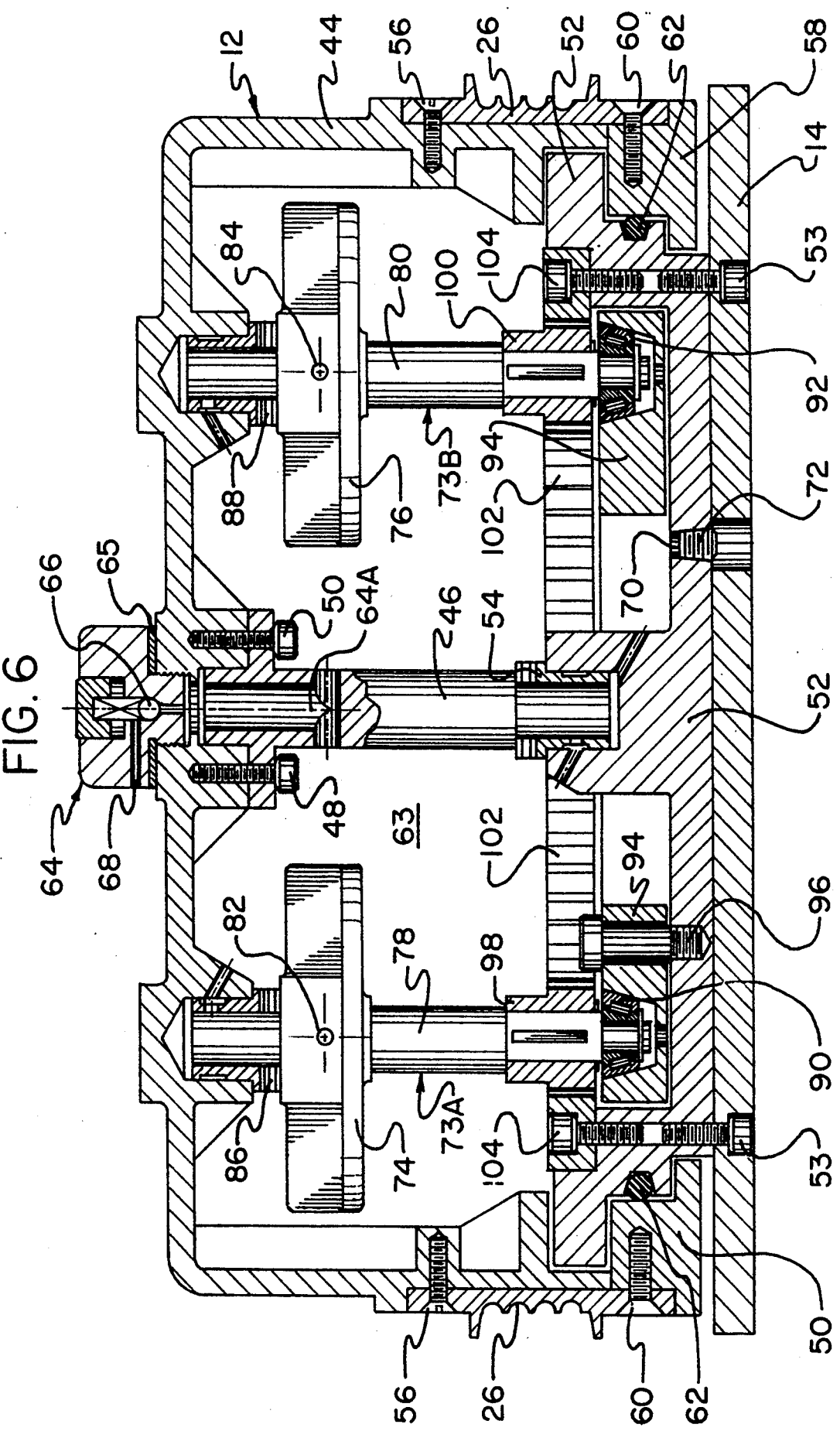
FIG. 6 is a cross sectional view taken along the line 6—6 of FIG. 4.
Figure 7:
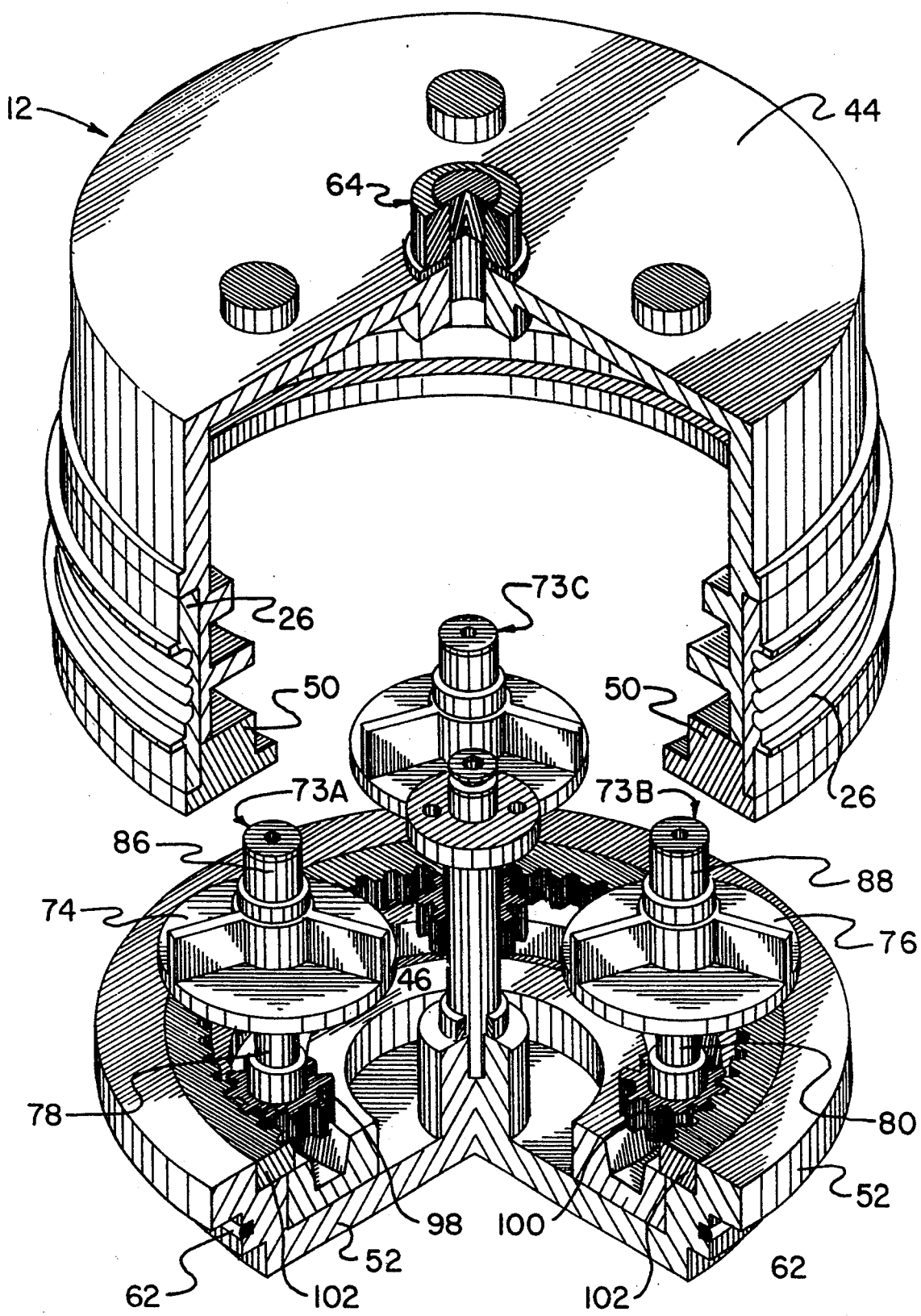
FIG. 7 is an exploded cross sectional view taken along line 6—6 of FIG. 4 detailing the components inside the invention.

With reference now to FIGS. 6 and 7 and in greater detail, the dampener assembly 12 comprises an outer case 44 which is secured to a center axle 46 by a pair of fasteners 48, 50. The center axle 46 is rotateably supported by a base 52 upon a bushing 54 to allow for the outer case 44 to rotate with respect to the base. The base 52 is fixedly secured to the base plate 14 by a plurality of fasteners 53. The cable guide 26 is secured to the outer case 44 by a plurality of fasteners 56 and is further secured to a sealing member 58 by a further plurality of fasteners 60. The sealing member 58 is formed in a manner so as to snugly fit against a seal 62 which allows oil (not shown) to reside in the space 63 inside of the outer case 44. A cap assembly 64 is removable secured to the top of the outer case 44 to allow for the addition of oil through a tunnel 64A present in the center axle 46. The cap assembly 64 rests upon a seal 65 to prevent the leakage of oil contained inside of the dampening assembly 12. The cap assembly 64 further includes a ball 66 that may be biased in an upward direction upon an increase in pressure within the dampener assembly 12 so as to allow for release of such pressure through the vent 68. The dampener assembly 12 further comprises a drain hole 70 and a drain plug 72 that may be removed to allow for draining of the oil inside of the dampener assembly. A plurality of oil passageways (not labeled) are present within the dampener assembly 12 to allow for conventional bearing lubrication.

Furthermore, and as best shown in FIGS. 6 and 7, a plurality of identical agitator assemblies 73A, 73B, 73C are mounted within the dampener assembly. For purposes of discussion, only agitator assemblies 73A and 73B will be described since both are clearly shown in FIG. 6 with it being understood that assembly 73C is substantially identical in structure and function. The three assemblies 73A, 73B, 73C are illustrative of the fact that any such number of these agitator assemblies could be used in the construction of the present invention. Continuing then, it will be seen that the agitator assemblies 73A, 73B include respective agitators 74, 76 which reside upon axles 78, 80 respectively, and are secured thereto by pins 82, 84. The axles 78, 80 are rotatably supported at their upper ends by the outer case 44 and by bearings 86, 88, respectively. The axles 78, 80 are further supported at their lower ends by respective roller bearings 90, 92. The roller bearings 90, 92 reside in a roller guide 94 that allows for the circumferential movement of the roller bearings and their respective axles 78, 80 through a circular path defined by the roller guide. The roller guide 94 is anchored to the base 52 by a plurality of fasteners, only one of such fasteners 96 being shown in FIG. 6 however. Fixedly secured in a conventional manner to the axles 78, 80 are spur gears 98 and 100 which engage a ring gear 102 that is anchored to the base 52 by a plurality of fasteners 104. The action created by the spur gears 98 and 100 engaging with the ring gear 102 is analogous to a planetary gear system wherein the spur gears and their respective axle and agitator assemblies function as the planets and the outer case 44 functions as the carrier with the ring gear 102 remaining stationary with respect to the base 52.

In use, a lateral motion of the trailer 16 would create a rotation of the dampener assembly 12 through the cable 18. Rotation of the dampener assembly 12 would then be converted into agitation of the oil contained within the dampener assembly through the planetary gear arrangement illustrated above. The agitation of the oil within the dampener assembly would create a dampening force opposite and proportional to the intensity of the lateral motion of the trailer thereby providing resistance to the motion and a termination of such motion.

As to a further description of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

What is claimed as being new and desired to be protected by Letters Patent of the United States is as follows:

1. A new rotary trailer sway dampener for mounting on the tongue of a trailer comprising:
    a rotatable dampening assembly mounted on said tongue; and
    a flexible cable, said flexible cable comprising first and second end portions and a middle section, said middle section of said cable engaging a periphery of said rotatable dampening assembly and said first and second send portions of said cable being adapted for connection to a towing vehicle,
    wherein said dampening assembly comprises a fluid dampener, and
    wherein said fluid dampener comprises an outer case and a base, said outer case being rotatably sealed to said base to allow fluid to reside inside of said outer case, and at least one agitator blade inside said outer case to agitate said fluid in response to movement of said outer case.

2. The new rotary trailer sway dampener of claim 1 and further comprising a means for adjusting tension on said cable means to keep said cable means tautly positioned around said dampening means.

3. The new rotary trailer sway dampener of claim 2 wherein said fluid dampener further comprises an oil dampener.

4. The new rotary trailer sway dampener of claim 2 and further comprising a ring gear with said at least one agitator being rotatably supported by said outer case and being engageable with said ring gear to rotate in a manner analogous to a planetary gear system.

5. The new rotary trailer sway dampener of claim 4 wherein said fluid is an oil.

6. The new rotary trailer sway dampener of claim 1 wherein said cable comprises a coated metallic cable.

7. The new rotary trailer sway dampener of claim 2 wherein said means for adjusting tension on said cable comprises a coupler with a threaded rod connected to a substantially similar threaded rod by said coupler whereby a distance between said threaded rod and said substantially similar threaded rod can be reduced with said coupler.

* * * * *